United States Patent [19]
Barker

[11] Patent Number: 5,664,924
[45] Date of Patent: Sep. 9, 1997

[54] ROUND BALE HANDLING SYSTEM

[76] Inventor: Terry D. Barker, Rte. 2 Box 294, Dunlap, Tenn. 37327

[21] Appl. No.: 664,559

[22] Filed: Jun. 17, 1996

[51] Int. Cl.[6] .................................................. A01D 90/00
[52] U.S. Cl. ........................ 414/24.6; 242/557; 414/24.5; 414/912; 414/920
[58] Field of Search .......................... 242/557; 294/107, 294/120; 414/24.5, 24.6, 912, 920

[56] References Cited

U.S. PATENT DOCUMENTS

| | | | |
|---|---|---|---|
| D. 243,326 | 2/1881 | Vandewater | D15/28 |
| 4,084,708 | 4/1978 | Goodvin | 414/912 X |
| 4,364,701 | 12/1982 | Lynch et al. | 414/24.6 |
| 4,514,127 | 4/1985 | Maier | 414/24.6 |
| 4,886,409 | 12/1989 | Penner | 414/24.6 |
| 4,968,205 | 11/1990 | Biasotto et al. | 414/24.6 |
| 5,067,870 | 11/1991 | Stattanson | 414/724 |
| 5,074,734 | 12/1991 | Price et al. | 414/24.6 |
| 5,316,427 | 5/1994 | De Long et al. | 414/24.6 |

*Primary Examiner*—Karen B. Merritt
*Assistant Examiner*—Janice L. Krizek

[57] ABSTRACT

A new Round Bale Handling System for offering a simple inexpensive device for lifting and unrolling round bales. The inventive device includes a frame, a lifting shaft, two tow chains, and a roll shaft. In use, the farm tractor 4 is backed up and the lifting shaft 30 is forced longitudinally axially into a round bale 2. The farm tractor's hitch is then used to lift the round bale 2 and the round bale 2 can be hauled by the farm tractor 4 to any desired location. When the round bale 2 has been placed, the farm tractor 4 is then relocated around and backed up to the round bale 2 so that the farm tractor 4 is normal to a rolling axis of the round bale 2. The roll shaft 50 is then pushed through the round bale 2 along its rolling axis and the tow chain 40 is rotatably attached to the roll shaft 50 by use of the retaining pin 56 and the hair clip pin 58. The farm tractor 4 then pulls the roll shaft 50 and the round bale 2 rotates about the roll shaft 50 and unrolls as it does so.

10 Claims, 3 Drawing Sheets

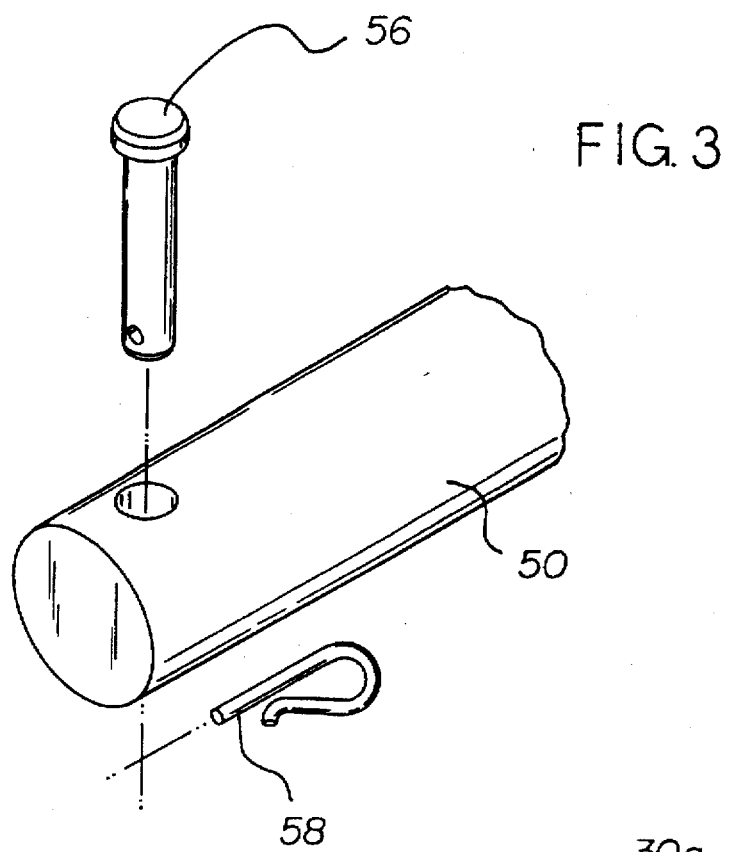
FIG. 3
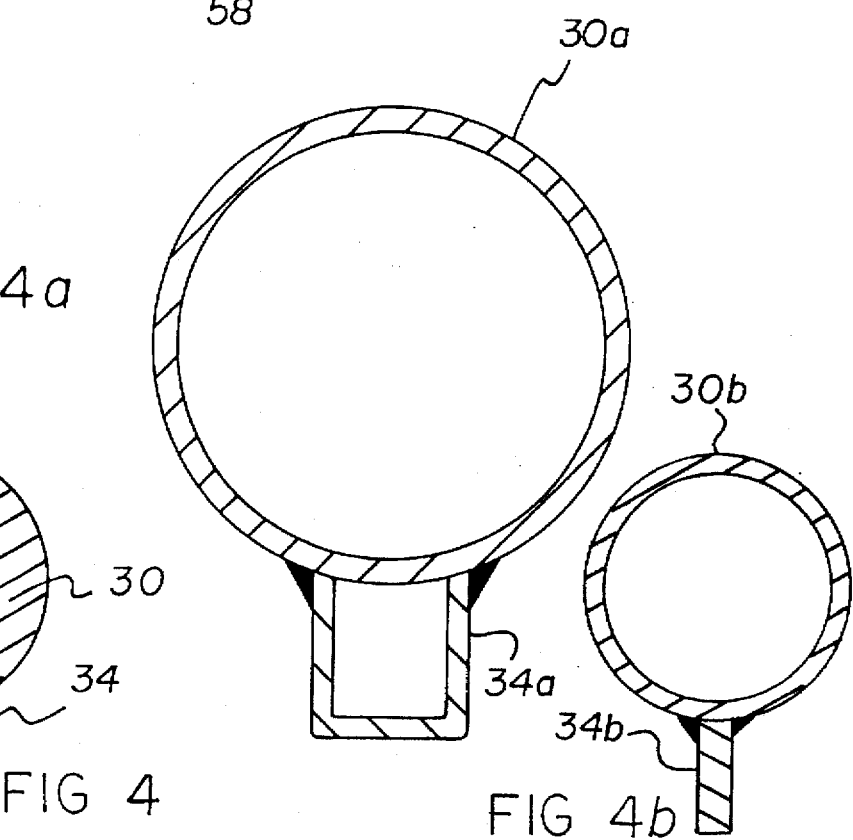
FIG. 4a
FIG. 4
FIG. 4b

ROUND BALE HANDLING SYSTEM

BACKGROUND OF THE INVENTION

1. Field of the Invention

The present invention relates to Farm Baling Equipment and more particularly pertains to a new Round Bale Handling System for offering a simple inexpensive device for lifting and unrolling round bales.

2. Description of the Prior Art

The use of Farm Baling Equipment is known in the prior art. More specifically, Farm Baling Equipment heretofore devised and utilized are known to consist basically of familiar, expected and obvious structural configurations, notwithstanding the myriad of designs encompassed by the crowded prior art which have been developed for the fulfillment of countless objectives and requirements.

Known prior art Farm Baling Equipment includes U.S. Pat. No. 5,074,734; U.S. Pat. No. 5,067,870; U.S. Pat. No. 4,886,409; U.S. Pat. No. Design 243,326; U.S. Pat. No. 4,968,205; and U.S. Pat. No. 4,514,127.

While these devices fulfill their respective, particular objectives and requirements, the aforementioned patents do not disclose a new Round Bale Handling System. The inventive device includes a frame, a lifting shaft, two tow chains, and a roll shaft.

In these respects, the Round Bale Handling System according to the present invention substantially departs from the conventional concepts and designs of the prior art, and in so doing provides an apparatus primarily developed for the purpose of offering a simple inexpensive device for lifting and unrolling round bales.

SUMMARY OF THE INVENTION

In view of the foregoing disadvantages inherent in the known types of Farm Baling Equipment now present in the prior art, the present invention provides a new Round Bale Handling System construction wherein the same can be utilized for offering a simple inexpensive device for lifting and unrolling round bales.

The general purpose of the present invention, which will be described subsequently in greater detail, is to provide a new Round Bale Handling System apparatus and method which has many of the advantages of the Farm Baling Equipment mentioned heretofore and many novel features that result in a new Round Bale Handling System which is not anticipated, rendered obvious, suggested, or even implied by any of the prior art Farm Baling Equipment, either alone or in any combination thereof.

To attain this, the present invention generally comprises a frame, a lifting shaft, two tow chains, and a roll shaft.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Round Bale Handling System apparatus and method which has many of the advantages of the Farm Baling Equipment mentioned heretofore and many novel features that result in a new Round Bale Handling System which is not anticipated, rendered obvious, suggested, or even implied by any of the prior art Farm Baling Equipment, either alone or in any combination thereof.

It is another object of the present invention to provide a new Round Bale Handling System which may be easily and efficiently manufactured and marketed.

It is a further object of the present invention to provide a new Round Bale Handling System which is of a durable and reliable construction.

An even further object of the present invention is to provide a new Round Bale Handling System which is susceptible of a low cost of manufacture with regard to both materials and labor, and which accordingly is then susceptible of low prices of sale to the consuming public, thereby making such Round Bale Handling System economically available to the buying public.

Still yet another object of the present invention is to provide a new Round Bale Handling System which provides in the apparatuses and methods of the prior art some of the advantages thereof, while simultaneously overcoming some of the disadvantages normally associated therewith.

Still another object of the present invention is to provide a new Round Bale Handling System for offering a simple inexpensive device for lifting and unrolling round bales.

Yet another object of the present invention is to provide a new Round Bale Handling System which includes a frame, a lifting shaft, two tow chains, and a roll shaft.

Still yet another object of the present invention is to provide a new Round Bale Handling System that saves hay and straw, time and money; feeds more cattle in a given amount of time, and gives the cattle more room to feed and therefore the cattle fight less.

Even still another object of the present invention is to provide a new Round Bale Handling System that can be made to fit any size tractor and in particular category 1 and 2 size tractors without the use of hydraulics.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an enlarged detail view of an end of a roll shaft of the present invention.

FIGS. 4, 4a, and 4b are a series of possible cross sectional views of a lifting shaft of the present invention.

DESCRIPTION OF THE PREFERRED EMBODIMENT

Figure 1:
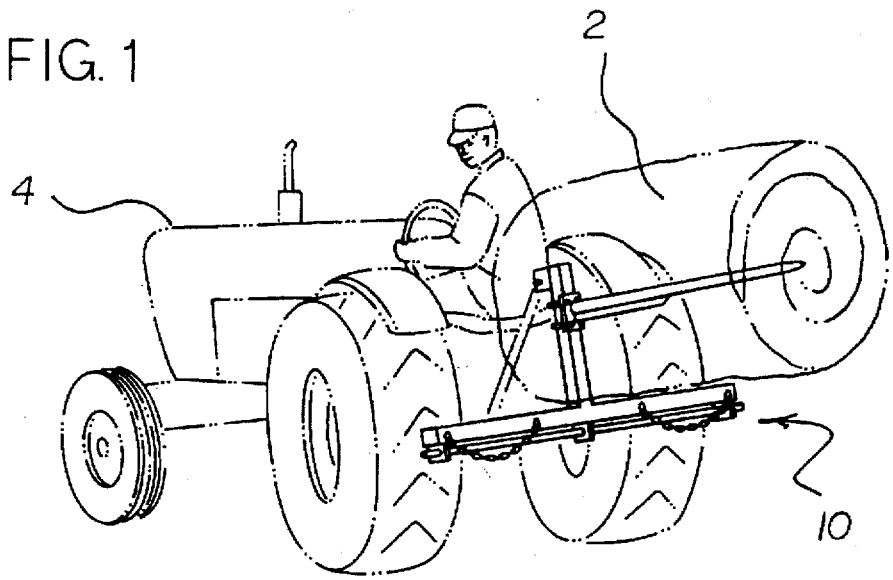
FIG. 1 is a left side perspective view of a new Round Bale Handling System in use according to the present invention.
Figure 2:
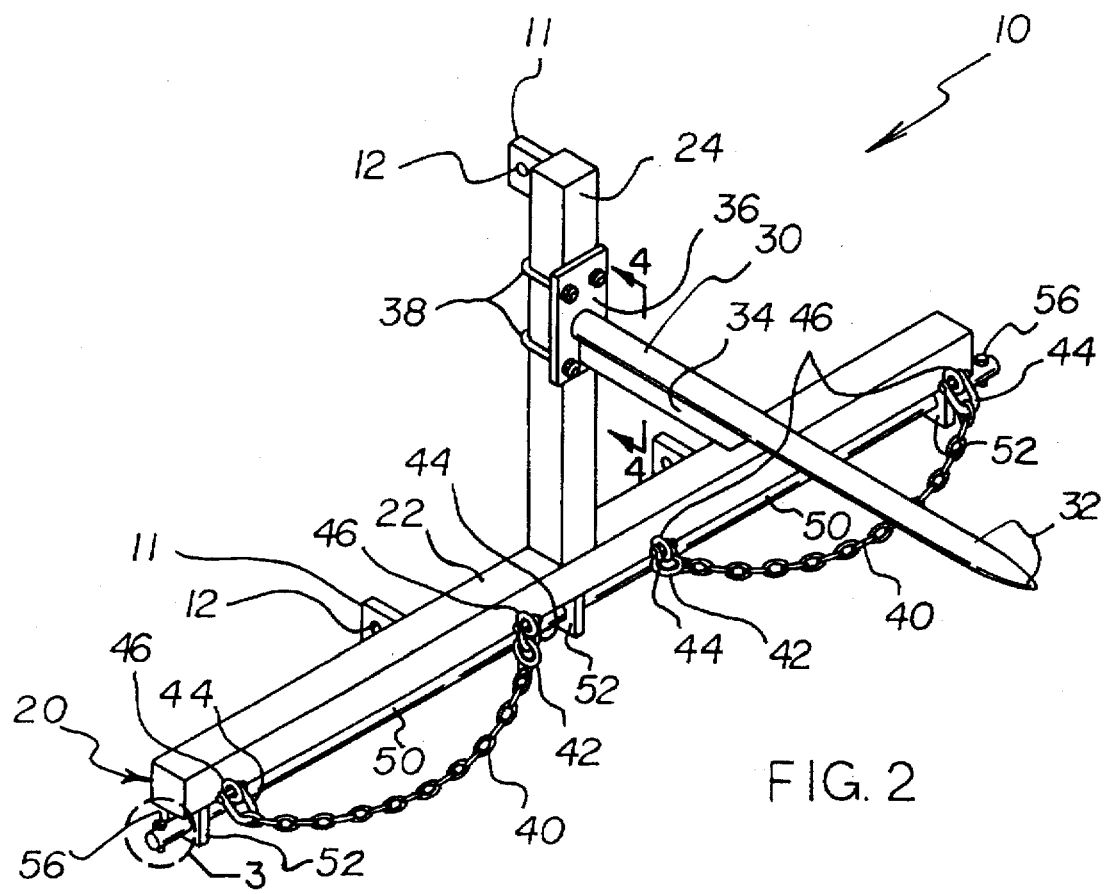
FIG. 2 is a left side perspective view of a new Round Bale Handling System according to the present invention.
Figure 5:
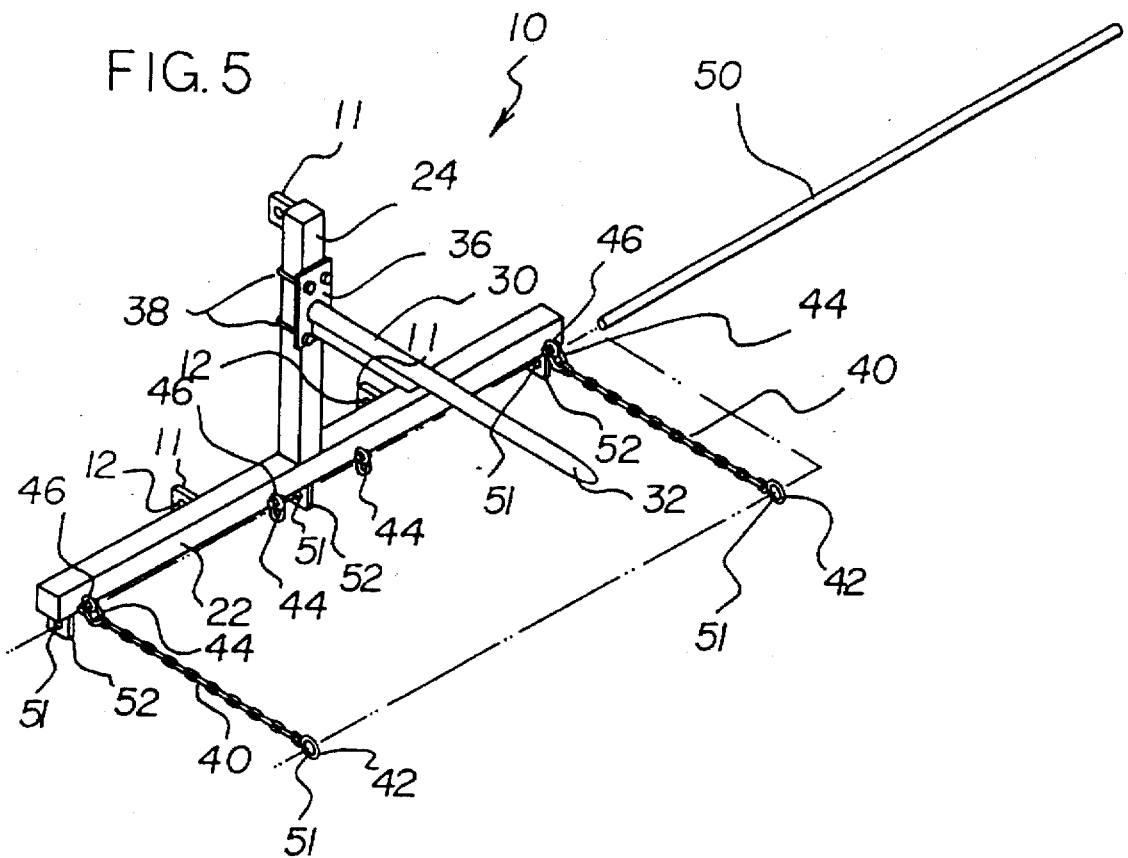
FIG. 5 is an exploded left side perspective view of a new Round Bale Handling System ready for use in unrolling a round bale according to the present invention.
Figure 6:
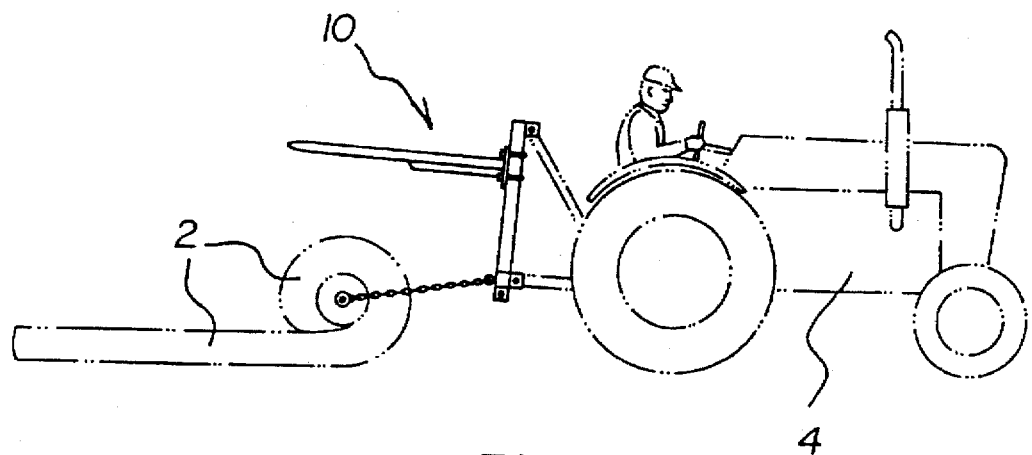
FIG. 6 is a side elevation view of the present invention in use.

With reference now to the drawings, and in particular to FIGS. 1 through 6 thereof, a new Round Bale Handling System embodying the principles and concepts of the present invention and generally designated by the reference numeral 10 will be described.

More specifically, it will be noted that the Round Bale Handling System 10 comprises a frame 20, a lifting shaft 30, two tow chains 40, and a roll shaft 50 where the roll shaft 50 is axially passed through a longitudinal center of a round bale and the two tow chains 40 rotationally hold each end of the roll shaft 50 tensionally to the frame 20 which also fixedly supports the lifting shaft 30.

As best illustrated in FIGS. 1 through 6, it can be shown that the frame 20 is comprised of a horizontal main beam 22 and a centrally located vertical strut 24 which extends upward from a top surface of the horizontal main beam 22 and where the vertical strut 24 is joined to the horizontal main beam 22 at a lower end of the vertical strut 24.

The frame 20 further includes an attachment means 11 which include hitch points 12 which are of old familiar design. The frame 20 is structurally designed to attach to a farm tractor 4 and to lift and pull a round bale 2.

The lifting shaft 30 is comprised of a shaft point 32, a reinforcement gusset 34, a base flange 36, and a lift shaft attachment means 38 where the shaft point 32 defines a vertex of a distal end of the lifting shaft 30 and the base flange 36 is centrally joined in a perpendicular orientation to a proximal end of the lifting shaft 30 and the reinforcement gusset 34 is integrally located in a vertical plane of a corner defined by the lifting shaft 30 and the base flange 36 and joins the lifting shaft 30 and the base flange 36.

Referring to FIGS. 4, 4a, and 4b, the construction of the lifting shaft 30 can be accomplished equally well by any one of many different arrangements. For example, with particular reference to FIG. 4, the lifting shaft 30 and the reinforcement gusset 34 can be made of solid material sections. Additionally, referring to FIG. 4a, the lifting shaft 30a and the reinforcement gusset 34a can be made of tubular hollow material sections. Also, referring to FIG. 4b, the lifting shaft 30b is made of tubular material section and the reinforcement gusset 34b is made of solid material section or vice versa.

The tow chain 40 further includes a chain shaft end 42 and a clevis assembly 44 where the chain shaft end 42 is sized to rotationally receive the roll shaft 50 and the clevis assembly 44 is utilized to removably and pivotally attach the tow chain 40 to the horizontal main beam 22 where the horizontal main beam 22 further includes clevis attachment means 46 which matingly receive the clevis assembly 44.

The frame 20 further comprises a plurality of roll shaft hanger supports 52 which are fixedly joined to the bottom surface of the horizontal main beam 22 and each possess a roll shaft aperture 51 which slidingly mate with the roll shaft 50 for the purpose of storing the roll shaft 50 while the roll shaft 50 is not in use. Additionally, the roll shaft 50 is retainably held within the roll shaft hanger supports 52 by a retaining pin 56 and the retaining pin 56 is removably held in and to the roll shaft 50 by a hair clip pin 58.

In use, the farm tractor 4 is backed up and the lifting shaft 30 is forced longitudinally axially into a round bale 2. The farm tractor's hitch is then used to lift the round bale 2 and the round bale 2 can be hauled by the farm tractor 4 to any desired location. When the round bale 2 has been placed, the farm tractor 4 is then relocated around and backed up to the round bale 2 so that the farm tractor 4 is normal to a rolling axis of the round bale 2. The roll shaft 50 is then pushed through the round bale 2 along its rolling axis and the tow chain 40 is rotatably attached to the roll shaft 50 by use of the retaining pin 56 and the hair clip pin 58. The farm tractor 4 then pulls the roll shaft 50 and the round bale 2 rotates about the roll shaft 50 and unrolls as it does so.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A round bale handling system comprising: a frame, a lifting shaft, two tow chains, and a roll shaft where the roll shaft is axially passed through a longitudinal center of a round bale and the two tow chains rotationally hold each end of the roll shaft tensionally to the frame which also fixedly supports the lifting shaft, and wherein the lifting shaft is comprised of a shaft point, a reinforcement gusset, a base flange, and a lift shaft attachment means where the shaft point defines a vertex of a distal end of the lifting shaft and the base flange is centrally joined in a perpendicular orientation to a proximal end of the lifting shaft and the reinforcement gusset is located in a vertical plane at a corner defined by the lifting shaft and the base flange and joins the lifting shaft and the base flange.

2. The round bale handling system of claim 1, wherein the frame is comprised of a horizontal main beam and a centrally located vertical strut which extends upward from a top surface of the horizontal main beam and where the vertical strut is joined to the horizontal main beam at a lower end of the vertical strut.

3. The round bale handling system of claim 1, wherein the frame includes an attachment means which include hitch points and where the frame is structurally designed to attach to a farm tractor and to lift and pull a round bale.

4. A round bale handling system comprising: a frame, a lifting shaft, two tow chains, and a roll shaft where the roll shaft is axially passed through a longitudinal center of a round bale and the two tow chains rotationally hold each end of the roll shaft tensionally to the frame which also fixedly supports the lifting shaft and wherein the frame is comprised of a horizontal main beam and a centrally located vertical strut which extends upward from a top surface of the horizontal main beam and where the vertical strut is joined to the horizontal main beam at a lower end of the vertical strut and wherein the frame further includes an attachment means which include hitch points and where the frame is structurally designed to attach to a farm tractor and to lift and pull a round bale and wherein the lifting shaft is comprised of a shaft point, a reinforcement gusset, a base flange, and a lift shaft attachment means where the shaft point defines a vertex of a distal end of the lifting shaft and the base flange is centrally joined in a perpendicular orientation to a proximal end of the lifting shaft and the reinforcement gusset is located in a vertical plane at a corner defined by the lifting shaft and the base flange and joins the lifting shaft and the base flange.

5. The round bale handling system of claim 4, wherein the lifting shaft and the reinforcement gusset are formed of solid material sections.

6. The round bale handling system of claim 5, wherein the lifting shaft and the reinforcement gusset are made of tubular hollow material sections.

7. The round bale handling system of claim 5, wherein the lifting shaft is made of tubular material section and the reinforcement gusset is made of solid material section.

8. The round bale handling system of claim 7, wherein each tow chain includes a chain shaft end and a clevis assembly where the chain shaft end is sized to rotationally receive the roll shaft and the clevis assembly is utilized to removably and pivotally attach the tow chain to the horizontal main beam where the horizontal main beam further includes clevis attachment means which matingly receive the clevis assembly.

9. The round bale handling system of claim 8, wherein the frame further comprises a plurality of roll shaft hanger supports which are fixedly joined to the bottom surface of the horizontal main beam and each posseses a roll shaft aperture which slidingly mates with the roll shaft for the purpose of storing the roll shaft while the roll shaft is not in use and where the roll shaft is retainably held within the roll shaft hanger supports by a retaining pin and the retaining pin is removably held in and to the roll shaft by a hair clip pin.

10. The round bale handling system of claim 9, whereby in use the farm tractor is backed up and the lifting shaft is forced longitudinally axially into a round bale and whereby the farm tractor's hitch is then used to lift the round bale and the round bale can be hauled by the farm tractor to any desired location and when the round bale has been placed, the farm tractor is then relocated around and backed up to the round bale so that the farm tractor is normal to a rolling axis of the round bale and whereby the roll shaft is then pushed through the round bale along its rolling axis and the tow chain is rotatably attached to the roll shaft by use of the retaining pin and the hair clip pin and whereby the farm tractor then pulls the roll shaft and the round bale rotates about the roll shaft and unrolls as the farm tractor pulls the roll shaft.

* * * * *